United States Patent
Cailow

[11] 3,872,441
[45] Mar. 18, 1975

[54] SYSTEMS FOR TESTING ELECTRICAL DEVICES

[75] Inventor: George William Cailow, Dukinfield, England

[73] Assignee: International Computers Limited, Putney, London, England

[22] Filed: Nov. 29, 1972

[21] Appl. No.: 310,426

[30] Foreign Application Priority Data
Dec. 1, 1971 United Kingdom............ 55734/71

[52] U.S. Cl........... 340/172.5, 324/73, 235/153 AC
[51] Int. Cl............................................... G06f 1/04
[58] Field of Search................ 340/172.5; 324/73 R; 235/153 AC

[56] References Cited
UNITED STATES PATENTS

| 3,246,240 | 4/1966 | Arnold et al..................... | 324/73 R |
| 3,492,572 | 1/1970 | Jones et al.................... | 235/153 AC |
| 3,528,006 | 9/1970 | Davis, Jr. et al................. | 324/73 R |
| 3,535,633 | 10/1970 | Fallon.............................. | 324/73 R |
| 3,541,441 | 11/1970 | Hrustich........................... | 324/73 R |
| 3,546,582 | 12/1970 | Barnard et al. .............. | 235/153 AC |
| 3,581,074 | 5/1971 | Waltz............................... | 324/73 R |
| 3,673,397 | 6/1972 | Schaefer....................... | 235/153 AC |

Primary Examiner—Gareth D. Shaw
Assistant Examiner—John P. Vandenburg
Attorney, Agent, or Firm—Hane, Baxley & Spiecens

[57] ABSTRACT

A computer controlled circuit tester is provided for applying predetermined signals to, or taking signals from, individual ones of an array of pins to which the circuit to be tested is connected. Identifier characters are decoded to determine tests to be performed in accordance with associated data characters. Provision is made for blocks of pins making up the array to be successively addressed automatically for energisation according to the data characters and also, using a particular identifier, for selecting any desired block of pins. Similar techniques are used to select desired delays in actions specified relative to the pins.

2 Claims, 3 Drawing Figures

SYSTEMS FOR TESTING ELECTRICAL DEVICES

BACKGROUND OF THE INVENTION

The present invention relates to systems for testing electrical devices.

In the manufacture of many types of electrical equipment, various types of electrical devices are mounted on a board or base member with the connecting leads or pins of each device being fixed to conductive portions of the board. Such devices may be logic circuits in the form of integrated circuit chips that are soldered to conductive portions of a printed circuit board. Since it is time consuming and expensive to remove faulty logic circuits from a printed board, it is customary to test the logic circuits before connection.

If there are only a relatively small number of logic elements to be tested in a particular system, testing is a relatively simply procedure. Input signals or forcing functions are applied to input terminals, while the input signals themselves may be checked to ensure that desired inputs have in fact been applied. Outputs signals or levels are then detected and compared with the output levels expected from logic circuits known to be operating properly. The above steps represent a common method of testing logic circuits, or for that matter, any type of circuit element. However, when a relatively large number of logic circuits are arranged in an array, or with many circuits being provided in integrated form on a single chip, it becomes virtually impossible to test input and output connections of each logic circuit.

In testing arrays of logic elements, a large number of pins, say 200 or so will have to be monitored. Also, various combinations of forcing functions and output levels will have to be checked to effectively test an array. It has been found that the only really practical way of conducting such a complex testing procedure is to employ a computer to control testing of the array. Regardless of whether a computer is dedicated to a particular testing system or is an undedicated general purpose computer, the overall cost ot the testing system is certainly significant.

While a computer controlled test system is necessary for the testing of large numbers of logic elements, it is desirable to reduce as far as possible the data transfers on any particular test. However when testing as many as 200 pins, the test data which is sent by the computer often will only change by a few characters from one test to the next. Stated another way, the data on only a small number of pins, say 5 or 10 pins, is likely to change from one test to the next while the data on the remaining pins likely to remain constant. Thus, the amount of test data can be substantially reduced if only test data relating to the changes are transferred to and from the testing station. Testing apparatus capable of the dynamic testing of operational circuits, as opposed to the mere static testing of component interconnections, has previously been proposed, for example, in U.S. Pat. No. 3,597,682 by John C. Hobbs, filed Nov. 12, 1968. In such apparatus it will be realised that it is necessary to provide operating supplies and input signals subject to operational timing requirements and to strobe the circuit outputs at appropriate times in relation to the input signals. Previous proposals for dynamic testers have required complex and costly timing arrangements.

According to the invention there is provided, a computer controlled circuit testing system comprising a control unit for receiving identifier and associated data characters from a central data processing unit, pin selection means responsive to addressing signals from the control unit for selecting, for test purposes, corresponding pins of an array to which a circuit is connected for test, the control unit comprising first means responsive to received identifier characters for producing control signals which, for corresponding functions, concern the way signals are to be applied to and/or taken from selected pins, second means for identifying successive ones of a plurality of groups or blocks of pins that together make up said array, third means responsive to successive outputs of the second means for supplying successive received data characters as said address signals for the pins of the corresponding groups or blocks, and fourth means responsive to particular identifier and associated data characters for addressing any one of said groups or blocks.

Conveniently, the pins are related to register stages, blocks of which are identified by said second means and loaded with said address signals whic determine whether or not function signals are applied to, or taken from, corresponding pins.

The second means may include a counter having a capacity corresponding to said plurality, the counter being responsive to timing strobe pulses appearing once per character reception cycle. The second means may further comprise a decoder responsive to the output of the counter for providing address signals representative of a said group of pins. The fourth means may comprise a store settable by the data characters and gating means for transferring the store contents to the counter.

Preferably, at least one identifier concerns delaying a test function for at least one selected group of pins, and the system further comprises means responsive to that identifier and its associated data characters for deriving and registering a measure of the desired delay, means for converting said measure to the desired delay, and means responsive to termination of the delay to produce a control signal.

The measure is preferably a binary number and the means for registering comprises a binary data store having separately addressable portions of different numerical significance, which portions correspond to data characters, respectively. The means for converting may then comprise a counter to which the store contents are transferable onece per system test cycle, the counter being decremented at a uniform rate.

INTRODUCTION TO THE DRAWINGS

Testing apparatus embodying the present invention will now be described, by way of example, with reference to the accompanying drawing, in which, FIG. 1 shows in diagrammatic form an arrangement of a central processing unit and a test station, FIG. 2 shows in diagrammatic form an arrangement for providing signals to groups of pins of a device under test, and FIG. 3 shows in diagrammatic form an arrangement for delaying signals to or from a device under test.

DESCRIPTION OF PREFERRED EMBODIMENT

Figure 1:
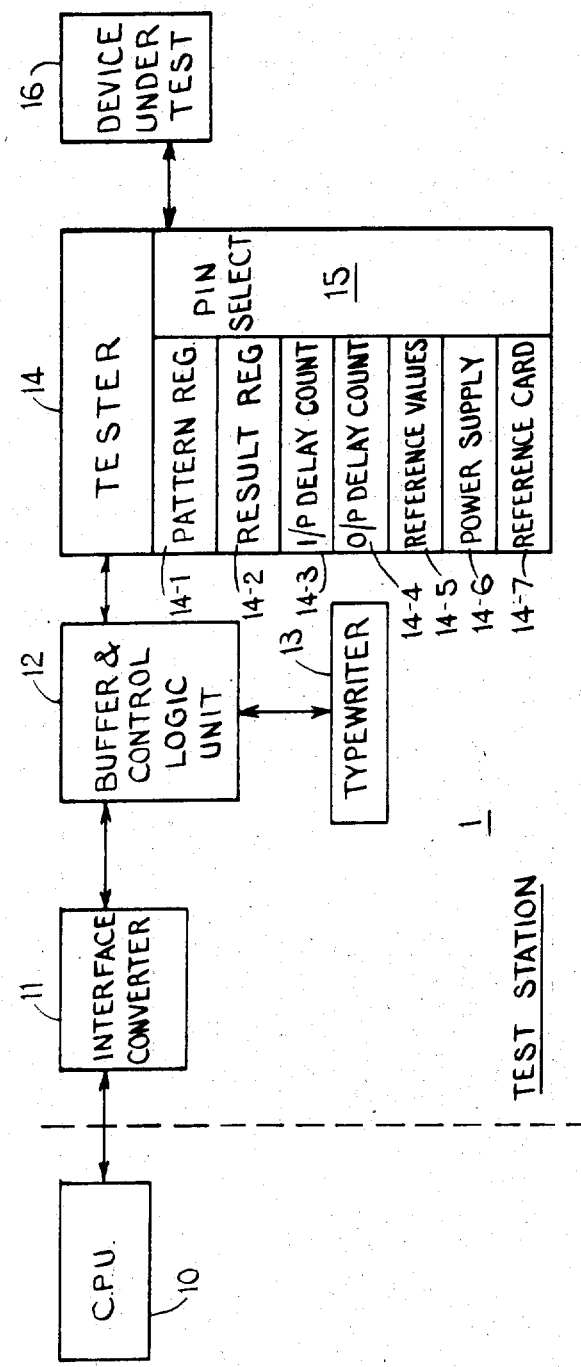

Referring now to FIG. 1, a central processing unit (C.P.U.) 10 is connected to transfer information to, or receive information from, interface converter 11 of test station 1. The C.P.U. 10 may be any known unit and is operated by control programs. Interface converter 11 provides a link between C.P.U. 10 and the testing system and may include an input/output control, code converters and status registers (not shown). A buffer and control logic unit 12 is connected between interface converter 11 and tester 14. Unit 12 controls access to, and may be accessed by, typewriter 13 which enables manual programming of test station 1. One purpose of buffer and control logic unit 12 is to provide signals determining action to be taken and signals to be applied by tester 14 in response to function identifiers in the output of interface converter 11. Also, tester 14 is controlled so that data for any group of pins may be changed without having to apply data to the remainder of the pins. This particular operation will subsequently be disucssed in detail with respect to FIG. 2.

In response to various control signals corresponding to function identifiers and produced by buffer and control logic unit 12, one or more sections of tester 14 will be caused to operate. The outputs of tester 14 will be applied to pin select logic 15 which in turn, will select the appropriate input pins of the device 16 under test and apply the necessary data thereto. Similarly, output signals appearing on the pins of the device 16 will indicate whether or not a 'fail' has occurred. By employing appropriate masking techniques, the 'fails' are used to determine outputs passed back to tester 14 by pin select logic 15.

For purposes of clarity, tester 14 will be considered as having a plurality of sections or registers. A pin selection section 15 will enable any pin of device 16 to be used as a signal input, a signal output or a power supply terminal. The logic for achieving this repeated for each pin, conveniently on plug-in cards. Any pin used as an input may be driven in any one of several modes. These modes including setting of logic levels, for the duration of a test period; applying pulses or fixed duration e.g. 20 n.s., starting from the beginning of a test period; delaying transitions in logic levels, relative to the start of a test period; similarly delaying the application of pulses; and freezing a logic level to prevent an input from returning to an initial state at the end of a test period. Logical state pattern and error pattern registers 14–1 and 14–2 corresponding to inputs and results are provided to cooperate with the appropriate logic in pin selection section 15. It will be realised that other modes of operation may be used such as masking out undesired pins during a test period.

Input and output delay count sections 14–3 and 14–4, respectively, will control the length of time that input levels or pulses and outputs, respectively, are delayed. The length of any delay is stored in a 'run-down' counter the contents of which represent multiples of a basic time interval at the end of which the counter is decremented by one. At zero the input section 14–3 produces an input initiating pulse, or the output section 14–4 produces a pulse that strobes the test results to the results register 14–2. This operation will be described subsequently with respect to FIG. 3. A reference card section 14–7 is employed to set nominal values for voltage comparators used to test each pin or test point, to preset the pulse widths of driving waveforms, and to select the polarity of power supply to be connected to the appropriate terminal of pin selection logic 15. In general these will be different selectable cards for the various types of device to be tested. A reference value section 14–6 is used to vary actual comparator reference levels from the nominal values, as governed by program. The polarity of the reference values is set by reference card 14–7 while the actual value is set by the software controlling C.P.U. 10 and, hence the tester 14.

There will be at least one identifier character associated with each section 14–1 to 14–7 of the tester 14. Data characters following at least some such identifiers, e.g. applying an individual logic level, a selected power supply level, a selected pulse width, freezing input levels, masking outputs, will determine which pins are to be subject to the appropriate function and may, additionally provide other information, such as selecting the sense of a logic level to be applied. Some identifiers will, of course be concerned only with setting up initial conditions for a following test, e.g. selecting power supply levels, selecting the appropriate reference levels (cards) for checking, setting voltage levels on all of the comparators of the pin select logic 15 (e.g. two per pin), setting voltage levels between which input signals may vary, the amount of delay to be applied on input or output, or selecting a particular group of pins to be a start point for the next function. The setting of comparator voltage levels should also involve pin addressing, of course. In general terms, the features as set out above and illustrated in diagrammic form in FIG. 1 correspond to the features provided in the dynamic test apparatus set out as noted earlier, in U.S. Pat. No. 3,597,682.

Figure 2:
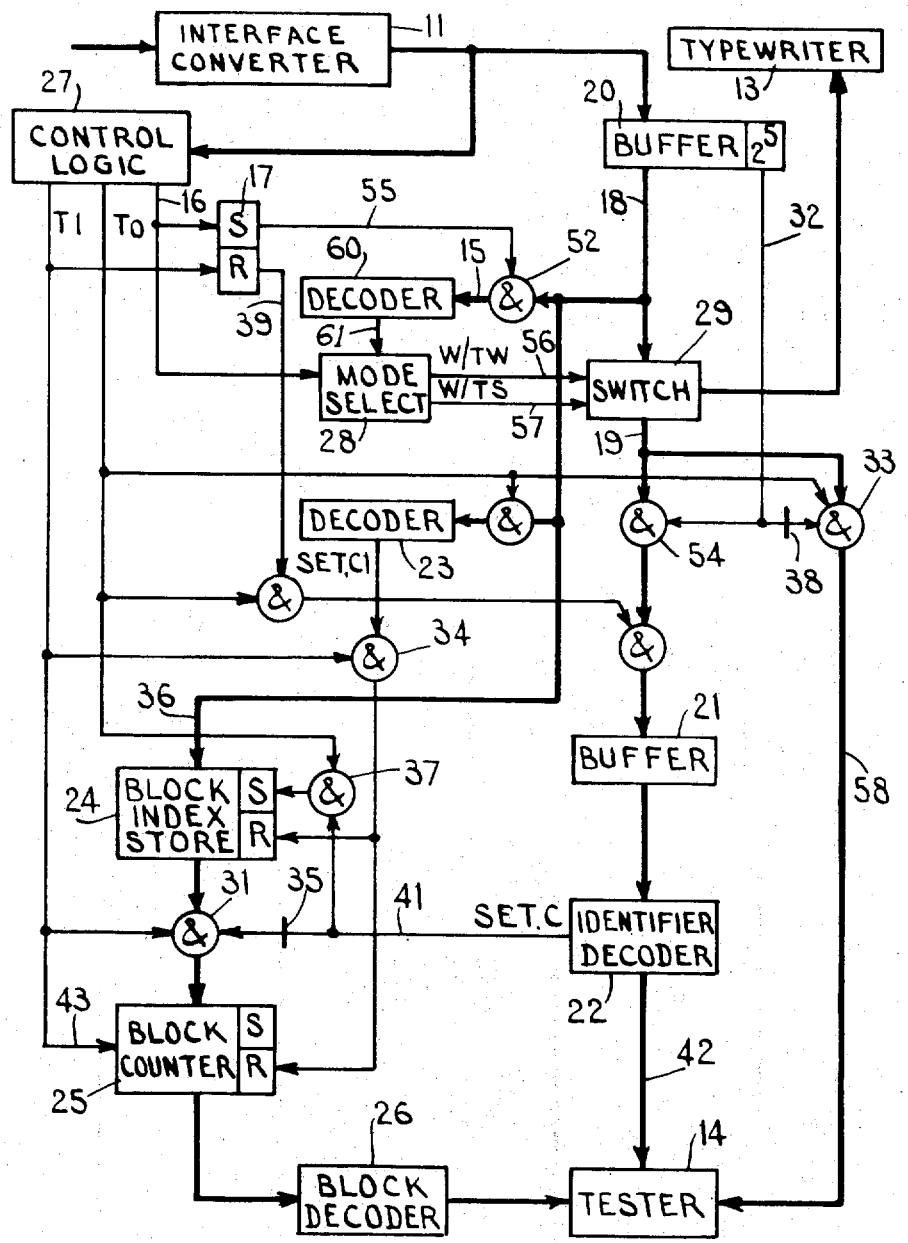

Broadly, in the ensuing description, FIG. 2 is applicable whenever pin addressing is concerned both on a normal group cycling basis and also for a specific start group. The specific group selection feature has more general applicability, in that it can be used to select any variable parameter, e.g. the particular part of a time delay representing number that requires alteration as mentioned in connection with FIG. 3.

As mentioned previously, a sophisticated system is required to be able to test a large number of pins in an array. However, it is important to reduce unnecessary data transfers in each test in order to reduce the amount of storage required. One obstacle which must be overcome in effectively transferring data is to transfer data relating to some pins without also transferring data relating to other pins in the array. The system shown in FIG. 2 will provide a means for addressing any group or block of pins and alter or change the data associated with pins in the addressed block without affecting the status of data on any other pins.

Before a data identifier and associated data characters are transferred between the interface converter 11 and tester 14, the mode of operation is selected. It will be assumed that a write command has been passed by interface converter 11 and is decoded by control logic 27 to produce a write signal on line 16 which causes a bistable device 17 to be set. The resulting signal is passed over line 55 to AND gate 52 to allow only the first character following a write command to pass from output 18 of buffer 20 to path 15. This character will determine whether the typewriter 13 or tester 14 is to be written to, and is decoded by decoder 60 and the result passed on path 61 to mode select 28 which produces signals W/TW or W/TS on lilnes 56 and 57 respectively depending on whether writing is to typewriter 13 or the tester 14. If the tester 14 is selected, switch 29 connects buffer output 18 to line 19. To determine whether a character in the buffer 20 is data or a data identifier, the $2^5$ bit of each character is examined. If the $2^5$ bit is a "1," the character is defined as a data identifer, and AND gate 54 is opened by line 32 to allow the data identifier to be written to buffer 21 on the occurrence of a strobe pulse To. Prior to this, a strobe pulse T1 will reset the bistable device 17 thereby energising line 39 so that subsequently appearing data characters ($2^5 = 0$) will be written directly to tester 14 over line 58 via AND gate 33 enabled by an inversion 38 of the signal on line 32. But first, the data identifier is decoded.

Upon selection of tester 14, the operation of the system will proceed in one of two ways. The first to be considered is when the data identifiers are other than the "SET C" identifier discussed later. An identifier, say, for example, relating to power supplies, reference levels etc. is strobed (at time To) into buffer 21. The identifier is then decoded by identifier decoder 22 and selects the appropriate register or section of tester 14. At time T1 the contents of an index block store are transferred through AND gate 31 to block counter 25. It will be noted that an inversion 35 of the "SET C" output 41 of the identifier decoder 22 is shown input to the AND gate 31 (in practice it will be separately ANDed with T1 to produce the enabling signal for AND gate 31). Block count decoder 26 applies an output which selects a part the the register in tester 14 selected by the identifier decoder 22 over path 42 and, upon the next strobe To a data character is read into the appropriate part of the selected register of tester 14.

After each data character, control logic 27 produces a strobe signal T1 and the T1 strobe signals are interleaved with To strobe signals, each T1 strobe increments block counter 25 by one. Each time block counter 25 is incremented, block count decoder 26 selects a different section of the appropriate register of tester 14. In this way, a subsequent data character is prevented from overwriting a previous character. Also the number of data characters sent to the particular register of tester 14 does not have to be specified with the data identifier thereby allowing varying amounts of data to be sent with any particular identifier.

The second type of operation of the system of FIG. 2 relates to the case in which it is desired to set the block index store and counter to point to a particular block or group that it is desired to alter. The previously monitored data identifier "SET C" is concerned and, once it reaches buffer 21, it is decoded by decoder 22 to produce a signal on line 41 that enables setting of the index block store 24 on the next To signal as determined by AND gate 37 whose output is connected to the store SET input. A related decoding of the data identifier decoder 23 produces a signal called "SET C1" which, via AND gate 34 serves to reset to zero block index store 24 and block counter 25, on the next T1 strobe pulse. The next character or characters received will define the index block number corresponding to the particular group of pins to be written to. The characters whic represent a block index number, are applied over line 36 to block index store 24. The contents of store 24 are transferred to counter 25 upon receipt of the next data identifier. By means of decoder 26, an appropriate portion of pin selection 14-1 of tester 14 is selected, thereby defining a particular group of pins. Thus, the subsequent data characters being passed through buffers 20 and 21 are applied only to the register section corresponding to the preselected group of pins. The strobe signal T1 is employed to increment counter 25 in the manner previously described.

It will be appreciated that, in practice, some of the gating shown in FIG. 2 is applied to data lines may be inherently present as enable terminals on integrated circuit packages. Alternatively, such gating may be replaced by gates applied to outputs of circuit blocks rather than to their inputs. For example, the decoders 60 and 23 may be a single circuit package with gates applied to alternative outputs representing the results of decoding.

Furhtermore, the decoder 60 and mode selector 28 will normally be capable of providing other outputs relating to read operations as well as the write operations mentioned above. The identifier decoder 22 is operable to decode an identifier which specifies channels or pins for the receipt of delayed input pulses. The amounts by which particular inputs are to be delayed are specified by a further data identifier and associated data characters. As will be clear from FIG. 3, it is preferred to utilise the block count/decoder units of FIG. 2 for further addressing functions related to portions of a delay defining store rather than to pin groups, which, in fact, merely means identifying portions of a different one of the tester registers (14-3 or 4 instead of 14-1 or -2). From the foregoing description it will be seen that FIG. 2 illustrates one arrangement for deriving, from a succession of characters which are applied to the various registers of the tester, firstly, data relating to pin selection which is presented finally at block decoder 26 and, secondly, data relating to the test conditions to be applied, as represented by the sequence of data characters applied to the buffer 20. To this extent, the provisions of the present arrangement closely follow the prior proposals, such as have been reviewed above. However, the timing arrangements of the present proposals not only permit the differential application of input supplies and signals but also provide for the desired relative timing between input signals to and output signals from the circuit under test.

It will be realised that the required timing will then be specified by the further data characters applied in sequence to Buffer 20, these characters being preceded by their associated input delay identifier. To obtain the required output stobe timing relative to the input delay, yet a further identifier, the output delay identifier, is provided and is followed by its associated data characters.

Figure 3:
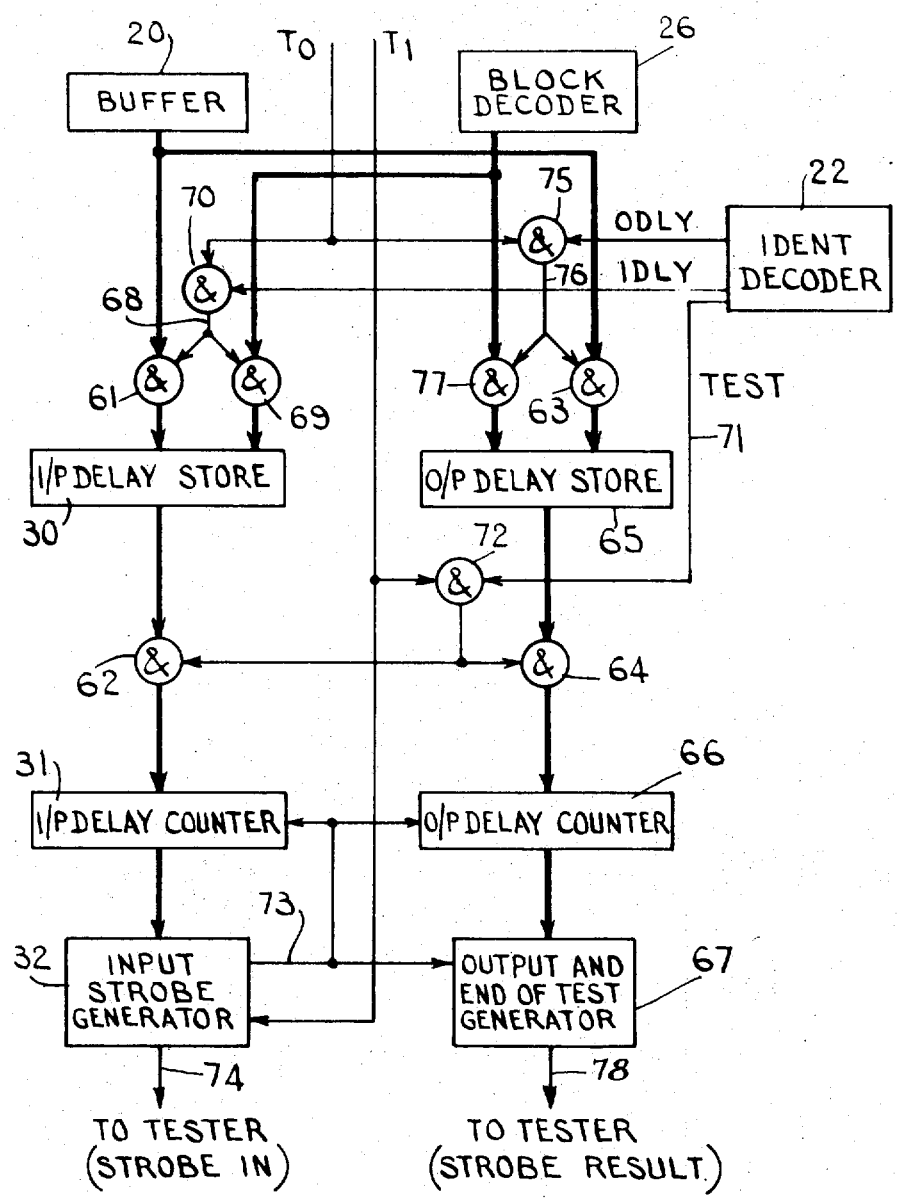

Referring to FIG. 3, an 'input delay' identifier is decoded by decoder 22, which is a conventional decoding network responsive to coded input characters to select different ones of a number of output lines, to produce an IDLY signal on line 68. This signal is applied to enabling input of AND gate 70 to cause the next To strobe to be passed via line 68 to enable AND gate 61 to pass the contents of the buffer 20 to input delay store 30. Relevant digits of the output of block count decoder 26 are applied through AND gate 69 also enabled from line 68 and serve to select a particular portion of store 30 to be overwritten. This is necessary because the delay store 30 will have many times more digits than the output of the buffer 20 so that each IDLY identifier may be followed by several data characters. The store 30 is, for example, a conventional storage device, such as a core storage matrix, and is typically aranged to store, for every pin of the tester, information as to whether delay is to be applied to that pin. The pin addresses, which are available from the block counter 25 (FIG. 2) through the decoder 26 enable the specified delay to be associated with all those pins to which it is to apply. Normal incrementing of the block count as described above will send the delay indications from the characters to successive portions of the delay store until the desired contents are achieved. The forcible setting of the block index store and the counter 25 by the Set C identifier alternatively permits the selection of particular pin storage groups so that is is unnecessary to scan completely through the store when this data is to be stored in relation to only a few pins. The data characters read from the buffer 20 to appropriate portions of the delay store 30 (FIG. 3) represent the amount of desired inpout delay as a number of basic time intervals, e.g. 5 manoseconds per interval. In response to the occurrence of a succeeding data identifier TEST, a decoded corresponding signal on line 71 from the identifier decoder 22 enables AND gate 72 so that the next T1 strobe pulse causes a delay indication from store 30 to pass through AND gate 62 to input delay counter 31 to set the counter to this particular number of time increments. Conveniently, the maximum number transferable from the store 30 to the counter 31 represents a total time less than the time interval between controlling strobe pulses. Counter 31 is run down to zero using count intervals of, for example, 5 nanoseconds from a clock output of an input strobe generator 32 that is triggered by strobes T1. Upon the counter 31 reaching zero, a zero indicator within an input strobe generator 32 recognises this fact and permits an output from the input strobe generator 32 to supply a delayed input enabling pulse on line 74 which, via pin selection 14-1 of tester 14 cause the appropriate pulses to be applied to the selected pins of the device under test (not shown). The data identifier TEST is then used as a trigger so that only after all the appropriate delay setting data characters have been set up, sent to the store 30, will the appropriate responses occur. It will be appreciated that the generator 32 is a pulse gating arrangement opened by the zero indicator and effective then to pass a signal from a signal train generator and that this same signal train generator is also used to provide the count down pulses.

In a similar manner, the time at which a particular output signal is examined may be delayed by a predetermined amount. The data identifier ODLY is applied to AND gate 75 to energise line 76. Block count decoder digits and the contents of buffer 20 are then passed, via AND gates 63 and 77, respectively, to output delay store 65 to fill appropriate portions of store 65 with data characters so as to define the time at which the outputs to be checked are to be examined. Upon receipt of strobe T1 and a TEST signal, the output of the AND gate 72 causes the delay indicator from store 65 to be passed via AND gate 64 to counter 66 to set the period of the output delay. Counter 66 is run down in a manner similar to counter 31 and upon reaching zero an output and end of test strobe signal is produced by a zero indicator in output strobe generator 67 on line 78 to the tester. It will be noted that, in order to avoid the generator 67 requiring a clock souce as well as a zero detector, the clock output 73 of the input generator 73 is supplied thereto.

The particular reason for delaying the time at which an output is examined is that it is often difficult, if not virtually impossible to predict how early a particular output will be present on a particular pin.

It will be realised that buffers 20 and 21, decoder 22 and 23, stores 24, 65 and 30 and counters 25, 66 and 31 may be comprised of conventional elements.

In summary, it will be seen that the present invention provides a system for testing arrays of logic elements which allows for any one of a plurality of data identifiers to be associated with any number of data characters. In particular, it allows any pin or group of pins or an array, to be selected for the application of signals of various types or the examination of outputs taken from such pins. Thus, by controlling paramters such as voltage level and the time of application of such levels, pins may be examined or employed in any one of several ways, i.e. input, output, power supply, etc. Also, by employing a data identifier such as SET C, data transfers from C.P.U. 10 to the test station 1, from one test to the next, are reduced as only the changes in test data relating to specified pins are transferred.

I claim:

1. In a dynamic circuit testing device having a plurality of test connections such as pins or the like connectable respectively to different portions of an electrical circuit to be tested, apparatus for controlling the time occurrence of signals associated with the test comprising:
  a buffer means for registering applied characters in succession, said characters including identifier characters and data characters wherein at least some of the data characters represent increments of time associated with said test;
  a decoder means responsive to an identifier character for generating at least first and second control signals;
  a signal delay store;
  first gating means responsive to said first control signal for permitting the passage of a data character representing an increment of time from said buffer means to said signal delay store;
  generating means for generating a strobe signal at a predetermined time after the receipt of data character representing an increment of time, said predetermined time being related to the increment of time represented by the received data character; and
  second gating means responsive to said second control signal for permitting passage of a data character representing an increment of time from said signal delay store to said generating means.

2. A dynamic testing device accordint to claim 1 wherein said generating means includes a presettable pulse counter means, means for presetting said counter means to a count related to a received data character representing an increment of time, means for periodically changing the count in said pulse counter means, and means for generating the strobe signal when a particular count is registered in said counter means.

* * * * *